United States Patent [19]

Rogler

[11] Patent Number: 5,317,814
[45] Date of Patent: Jun. 7, 1994

[54] MEASURING CALIPER INSTRUMENT HAVING A DIGITAL DISPLAY AND METHOD FOR CALIBRATING SAME

[75] Inventor: Albert Rogler, North Scituate, R.I.

[73] Assignee: Central Tools, Inc., Cranston, R.I.

[21] Appl. No.: 867,172

[22] Filed: Apr. 10, 1992

[51] Int. Cl.$^5$ .............................. G01B 5/12; G01B 7/12
[52] U.S. Cl. ........................................ 33/810; 33/811; 33/542
[58] Field of Search ................. 33/810, 811, 812, 783, 33/784, 555.1, 542, 543, 542.1, 700, 701; 73/1 R

[56] References Cited

U.S. PATENT DOCUMENTS

| | | | |
|---|---|---|---|
| 2,677,894 | 5/1954 | Belgard | 33/811 |
| 4,229,883 | 10/1980 | Kobashi | 33/810 |
| 4,782,595 | 11/1988 | Diewert | |
| 4,972,603 | 11/1990 | Meyer | |
| 4,982,505 | 1/1991 | Pocci | 33/542 |
| 5,048,197 | 9/1991 | Anderson | 33/812 |

Primary Examiner—William A. Cuchlinski, Jr.
Assistant Examiner—C. W. Fulton
Attorney, Agent, or Firm—Lackenbach Siegel Marzullo Aronson & Greenspan

[57] ABSTRACT

A linear measuring instrument having a pair of measuring tips mounted on respective jaws moveable relative to one another along an elongated beam particularly adapted for measuring inside dimensions has a digital display unit responsive to display increments of movement of one jaw relative to the beam on which the jaw is slidingly mounted. The pair of measuring tips are spaced from one another, when the jaws are in engagement with one another, a selected calibration distance. The end user of the instrument follows a sequence of steps, including resetting the display unit to read zero and then adjusting and fixing the position of the other jaw to the beam until the selected calibration distance registers on the display unit.

10 Claims, 2 Drawing Sheets

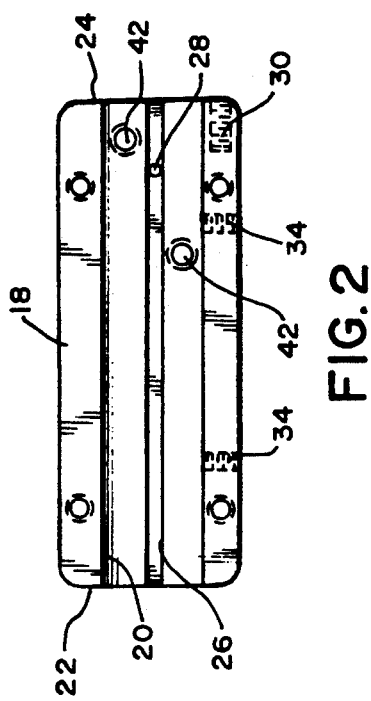
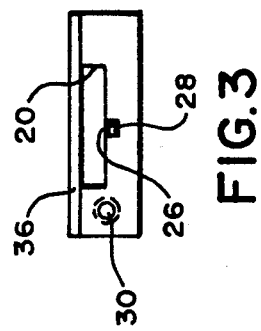
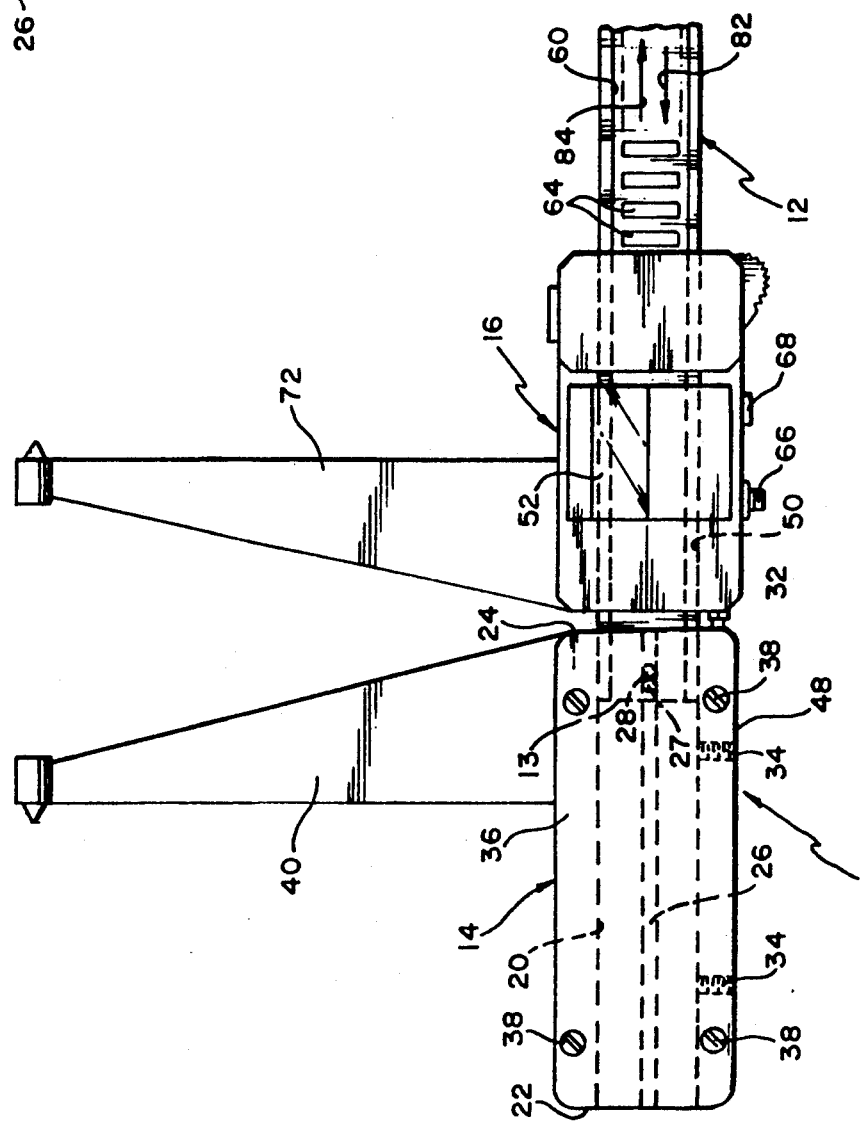

MEASURING CALIPER INSTRUMENT HAVING A DIGITAL DISPLAY AND METHOD FOR CALIBRATING SAME

BACKGROUND OF THE INVENTION

This invention relates to a measuring caliper instrument and more particularly, to such instruments used for measuring inside diameters and the like, such as the internal diameter of cylindrical brake drums.

Periodically it is necessary to check the wear of vehicle brake drums to determine if the drums are within a prescribed tolerance range. This tolerance range, set by the manufacturer, insures that the brake drums are still within a certain internal diameter and secondly, the degree of roundness. If a brake drum's internal diameter does not fall within the prescribed ranges, then the drum may be machined or replaced.

U.S. Pat. No. 4,782,595 shows a device used to measure the internal diameters of brake drums comprising a two-part bracket with a portion of one part slidingly received within the other part and with a dial gauge having a rotating member adapted to rotate as the parts are moved relative to one another. Pins are mounted at opposite ends of the device and are placed within a brake drum with the two-part bracket spread apart until both the pins contact the drum wall with the gauge indicating the distance between the pointers through a rack and pinion arrangement.

The device is calibrated by inserting the pins between two end tabs of a calibration bar so that a pointer of a course scale on the bracket and the dial gauge pointer indicate the known length of the calibration bar.

In order to take a measurement with the device one must add the two numbers thereby increasing the time needed to take a reading than would be required with a single scale as well as increasing the possibility of making an incorrect reading.

Linear measuring devices useful for both outside diameters as well as inside diameters are known in the art having digital display units which facilitate quick and accurate taking of measurements as shown, for example in U.S. Pat. Nos. 4,229,883 and 4,972,603. Both of these devices incorporate an elongated beam member on which is disposed circuit means which cooperate with a caliper member mounting a battery powered digital display unit which has pick-up and counting means responsive to the circuit means on the beam so that the amount of movement on the caliper member is successively digitally displayed. The digital display units are provided with re-setting means so that the display counter can be calibrated by being made zero at a selected position, for example, when inside dimension measuring bill 3 of Pat. No. 4,229,883 passes moveable bill 17 when their measuring surfaces come into alignment or as shown in FIG. 7 of Pat. No. 4,972,603 when measuring jaws 88, 81 pass one another so that their measuring surfaces come into alignment.

However the provision of measuring arms which are configured and mounted in such a manner as to pass one another and still provide accurate, reliable movement, is expensive and relatively complex.

It is an object of the invention to provide an improved linear measuring instrument having digital display means particularly suitable for measuring inside dimensions such as internal diameters.

Another object is the provision of such an instrument which is relatively inexpensive and yet is reliable and is easily used in a consistent manner from one user to another.

Yet another object is the provision of a method for calibrating to a selected standard dimension a measuring instrument particularly suited for measuring inside diameters.

Briefly, in accordance with the invention, calipers adapted for measuring internal diameters and the like having a digital display unit are provided with first and second jaw members slideably mounted on an elongated beam. Each jaw member has an arm mounting a measuring tip extending in a first direction with the arms both lying in the same plane. The first jaw member comprises a frame formed with a beam receiving recess and a groove in communication with the recess. A stop surface is disposed in the groove which interacts with a stop pin mounted on the beam adjacent an end thereof and moveably received within the groove. Set screws are mounted in the frame to selectively fix the frame to the beam and an adjustment screw moveable in the direction of the longitudinal axis of the beam extends from the side of the frame closest to the second jaw member toward the second jaw means. The second jaw member comprises a housing mounting the digital display unit which is provided with a needle receiving resetting aperture.

According to a feature of the invention, one side of the frame is placed flush with one side of the beam and the frame is then fixed to the beam by the set screws. With the two jaw members in engagement with one another, the adjustment screw is rotated until the distance between the measuring tips equals a selected calibration distance at which point the adjustment screw is fixed in place. The caliper instrument is then in condition to provide to an end user.

According to a feature of the invention, an end user calibrates the display unit by loosening the set screws and, with the two jaw members held in engagement with one another, moving the beam to the right as seen in FIG. 4 until the stop pin engages the stop surface. A calibration needle is then inserted into the resetting aperture of the display unit to cause the display to show zeros. The beam is then moved in the opposite direction, i.e. to the left as seen in FIG. 4, until the selected calibration distance is displayed and the set screws are retightened to fix the position of the frame to the beam. The instrument will then remain in its calibrated condition until battery replacement or in the event that the original factory calibration is changed.

BRIEF DESCRIPTION OF THE DRAWINGS

Other objects and advantages of the invention will become apparent upon reading the following detailed description and upon reference to the drawings in which:

FIG. 2 is a top plan view of the jaw frame used in the FIG. 1 caliper;

FIG. 3 is a side view of the FIG. 2 jaw frame shown with a cover thereon; and

FIG. 4 is a front elevational view of the FIG. 1 caliper partly broken away, in intermediate stage in which the digital display is being adjusted.

DETAILED DESCRIPTION OF THE INVENTION

Figure 1:
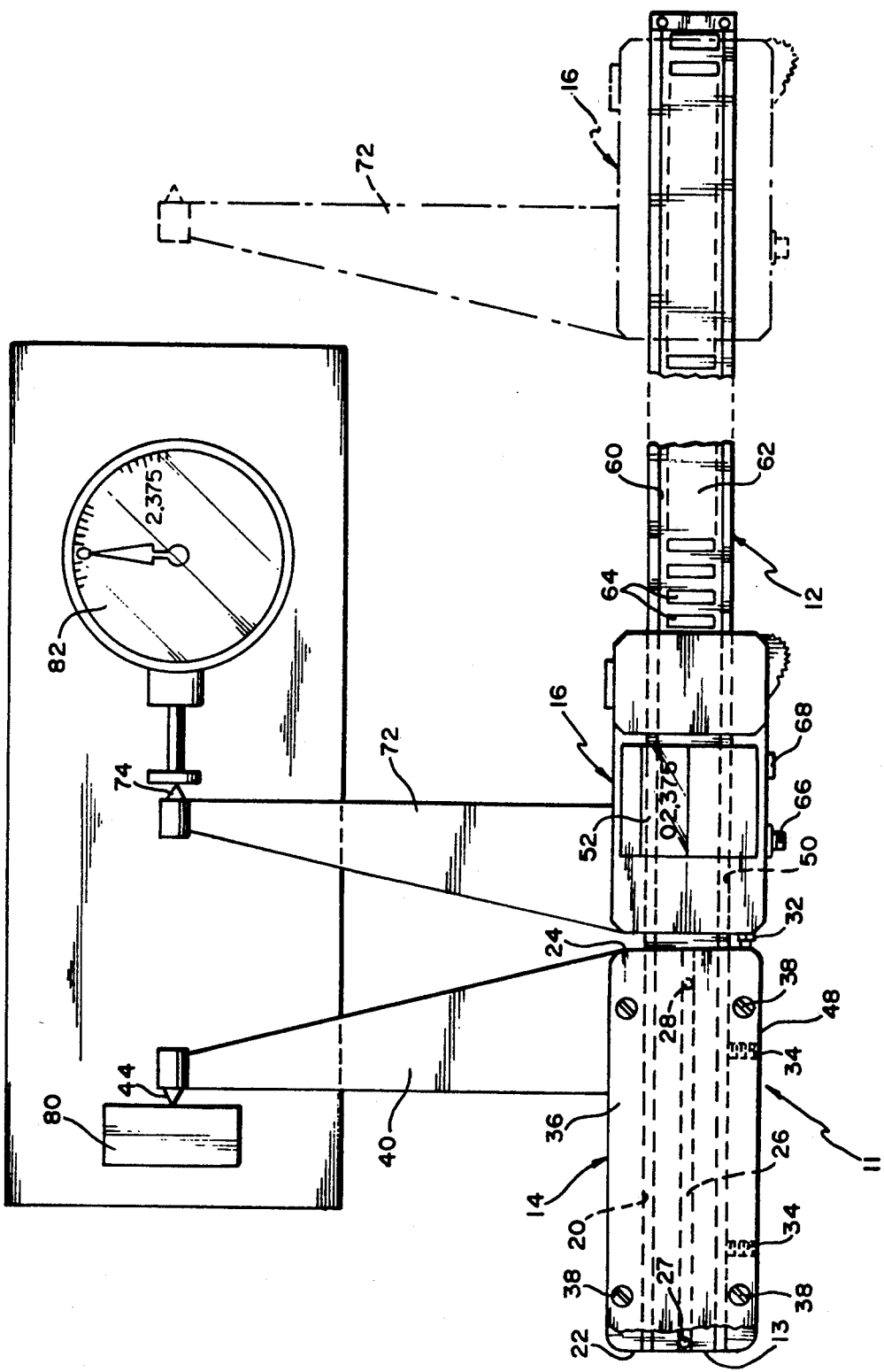
FIG. 1 is a front elevational view of a digital caliper made in accordance with the invention placed in a calibration fixture.

Referring more particularly to the drawings, a caliper device 10 of the type adapted to measure inside diameters is shown comprising an elongated beam 12 on which first and second jaw members 14 and 16 are slideably mounted. Jaw member 14 comprises a frame 18 having a slot 20 extending from side 22 of frame 18 to its opposite side 24 and is adapted to receive beam 12 therein. A groove 26 is formed in the bottom wall of slot 20 in communication and co-extensive therewith from side 22 of the frame to side 24. A stop pin 28 is fixedly located adjacent side 24 for a purpose to be explained below. Alternatively, if desired, groove 26 could be formed so that it extended from side 22 only to the location of pin to thereby provide a suitable stop surface. A corresponding stop pin 27 depends from beam 12 adjacent its left end i3 (as seen in FIG. 1) and is adapted to move in groove 26. A threaded bore 30 (FIG. 2) is formed in side 24 of frame 18 and a stop screw 32 (FIG. is received therein. First and second set screws 34 are received in respective threaded bores in the bottom of frame 18 and are adapted to extend into slot 26 so that frame 18 can be fixed to beam 12 at any selected relative position. A cover 36 is disposed over slot 20 and is fixed to frame 18 by suitable fastening means such as screws 38. Arm 40 is fixedly attached to frame 18 as by screws received in threaded bores 42 shown in FIG. 2. An outwardly extending measuring tip or anvil 44 is fixed to the upper free distal end of arm 40 by any conventional means such as screwing into a threaded bore and being locked therein with epoxy. Jaw member 16 comprises a housing 48 in which a slot 50, similar to slot 20 in frame 18, is formed from side to side to slidingly receive beam 12. A conventional measuring circuit/digital display unit 52 is disposed in housing 48 and is adapted to display a digital number which is incremented or decremented as jaw member 16 is moved along beam 12. Beam 12 is an elongated member formed of suitable material such as stainless steel with a centrally located recessed portion 60 in which a flexible circuit board 62 is disposed which comprises a series of parallel etched windows 64 extending along the entire length of the beam, only two of which are shown in FIG. 1. The measuring circuit/digital display unit 52 interacts to count the windows as unit 52 passes by in a known manner. A unit of this type is shown in U.S. Pat. No. 4,972,603. Unit 52 has a first input button 66 which when depressed, alternately changes the display between inches and millimeters. A second input 68 is provided for resetting or zeroing the display but a button which normally would be provided has been removed to prevent nuisance tripping. As will be explained below, a needle is used during a calibration sequence normally performed by a user only when a battery has been replaced or in the event that factory calibration has changed.

Arm 72 is fixedly attached to housing 48 in a conventional manner, by screws (not shown) in the same manner as arm 40. An outwardly extending measuring tip or anvil 74 is mounted at the distal free end of arm 72 in the same manner as anvil 44.

Anvils 44 and 74 are mounted on their reoperative arms so that an imaginary line drawn through their tips is parallel to the longitudinal axis of beam 12.

Upon initial assembly of the caliper device 10, beam 12 is placed so that its left end, as seen in FIG. 1, is flush with side 22 of frame 18 and lock screws 34 are then secured to the beam. The unit is then placed in a calibration fixture with anvil 44 of jaw member 14 in engagement with a fixed reference member 80. Stop screw 32 is then rotated to depress the input stem of the dial indicator 82 until a selected calibration dimension is obtained, for example 2.375 inches. A set screw is used to lock the screw threads of stop screw 32 to fix it in frame 18 and prevent further movement. A battery is then installed in the display unit 52 which will then display some random number confirming that electrical power is being supplied to unit 52.

Device 10 is then ready for final calibration. The following sequence will complete calibration of the device. First jaw member 16 is placed against the fixed stop screw 32. Set screws 34 are then loosened and holding jaw members firmly together beam 12 is pulled out horizontally to the right, as seen by arrow 84 in FIG. 4, until stop pin 27 on beam 12 engages stop pin 28 in slot 26 of frame 18. A pin is then inserted in input 68 of unit 52 to change the random reading to all zeros. Beam 12 is then moved to the left as noted by arrow 86 in FIG. 4 until the selected calibration is displayed, in the example indicated above to 2.375 inches. Set screws 34 are then retightened to complete the calibration sequence. Any dimensional reading between 2.375" and the remainder of the length of beam 12 can then be obtained. As noted above, recalibration will not be necessary until the battery is replaced or in the event that factory calibration is changed.

Various changes and modifications in the above described embodiment and method will be readily apparent to those skilled in the art and any such change or modifications are deemed to be within the spirit and scope of the present invention as set forth in the appended claims.

I claim:

1. A measuring instrument with a digital display comprising an elongated beam having first and second sides and having a longitudinal axis with circuit means disposed thereon:

first and second jaw means slideably mounted on the beam and respectively having first and second arms projecting in a first direction each are having a free distal end, a measuring anvil mounted on each free distal end having a measuring tip portion extending in opposite directions from one another and defining a predetermined non-zero distance between said measuring tip portions when said first and second jaw means are in abutment against each other, an imaginary line drawn through the tip portions being parallel to the longitudinal axis of the beam, said first jaw mean having a frame to which said first arm is attached, said frame having first and second sides and having a recess extending longitudinally from side to side adapted to slidingly receive the beam and having a longitudinally extending groove in communication with said recess, said groove extending from one side of said frame to at least a stop surface intermediate said first and second sides of said frame, said beam having a stop pin mounted adjacent one side of said beam and being adapted to project into said groove of said frame when said beam is received in said recess of said frame, fixing means to selectively fix said first jaw means to the beam at a selected location along the length of said beam and adjustment surface means moveably mounted on a side of said frame adapted to engage said second jaw means when said two jaw means are moved into engagement with one another to establish a precise calibration distance between said measuring tip portions when said first and second jaw means are in abutment against each other, said second jaw means having a housing, a digital display unit mounted in said housing, the display unit being responsive to lateral movement of said second jaw means along the length of said beam by means of circuit means, and said display unit having a zeroing input means.

2. A measuring instrument according to claim 1 in which the arms lie in a plane.

3. A measuring instrument according to claim 1 in which said zeroing input means includes a needle receiving aperture adapted to receive a needle element therethrough in order to reset said display unit.

4. A measuring instrument according to claim 3, wherein said zeroing input means includes a zeroing reset button recessed in said frame to normally be inaccessible; and further includes a needle element dimensioned to be received within said frame recess, whereby said zeroing reset button is normally protected to prevent accidental loss of calibration and can only be actuated by intentional insertion of said needle element through said frame recess to contact said zeroing reset button.

5. A measuring instrument according to claim 1 in which said adjustment surface means includes a threaded member the position of which is adjusted so that when said jaw means are in engagement with one another, a selected distance extends between said tip potions, and means to fix the threaded member in its adjusted position.

6. A measuring instrument according to claim 1 in which said stop surface is a threaded pin received through a wall in said frame and into said groove.

7. A measuring instrument according to claim 1, in combination with calibration jig means for engaging and spacing said tip portions a precise pre-selected distance from each other by adjusting said surface means when said jaw means are in abutment against each other.

8. A process for calibrating a measuring instrument having a digital display and having an elongated beam extending from a first side to a second side and first and second jaw means slideably mounted on the beam, the first jaw means having a frame formed with a beam receiving recess extending between first and second sides of the frame and a groove formed in the frame in communication with the recess and extending from one side to at least a stop surface disposed between the first and second sides of the frame, the beam having a stop pin projecting into the groove, the jaw means each having a measuring tip mounted on an arm extending from a respective jaw means, comprising the step of placing a first side of the beam so that it is flush with a first side of the frame, fixing the position of the frame on the beam, and then moving an adjusting surface disposed on the second side of the frame away from the frame with the jaw means in engagement with one another until a selected calibration distance extends between the measuring tips and then fixing the position of the adjusting screw relative to the frame.

9. A process according to claim 8 including the steps of insuring that the jaw means are in engagement with one another, unfixing the position of the frame to the beam, maintaining the jaw means in engagement with one another while moving the beam in a direction until the stop pin engages the stop surface, resetting the display unit so that only zeros are displayed, moving the beam in an opposite direction until the selected calibration distance is displayed and then refixing the position of the frame on the beam.

10. A process according to claim 9 in which the distance between the stop pin and the stop surface, when the first side of the beam is flush with the first side of the frame, is at least as great as the selected calibration distance.

* * * * *